(No Model.)

T. C. STEIMER.
GLASS MEASURING APPARATUS.

No. 549,404. Patented Nov. 5, 1895.

WITNESSES
H. M. Corwin
C. Byrnes.

INVENTOR
Theodore C. Steimer
by Bakewell & Bakewell
his Attorneys.

ANDREW B. GRAHAM, PHOTO-LITHO. WASHINGTON, D.C.

UNITED STATES PATENT OFFICE.

THEODORE C. STEIMER, OF FINDLAY, OHIO.

GLASS-MEASURING APPARATUS.

SPECIFICATION forming part of Letters Patent No. 549,404, dated November 5, 1895.

Application filed April 24, 1895. Serial No. 547,027. (No model.)

*To all whom it may concern:*

Be it known that I, THEODORE C. STEIMER, of Findlay, in the county of Hancock and State of Ohio, have invented a new and useful Improvement in Glass-Measuring Apparatus, of which the following is a full, clear, and exact description, reference being had to the accompanying drawings, forming part of this specification, in which—

Figure 1:
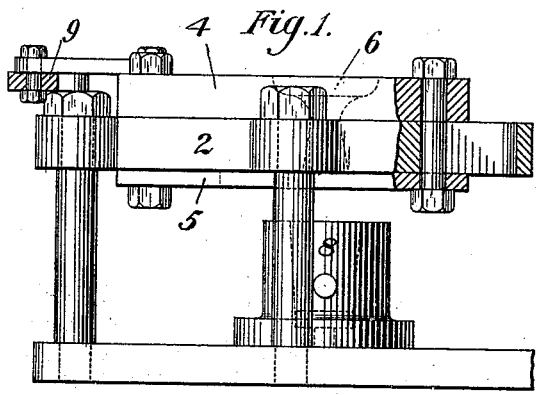
Figure 2:
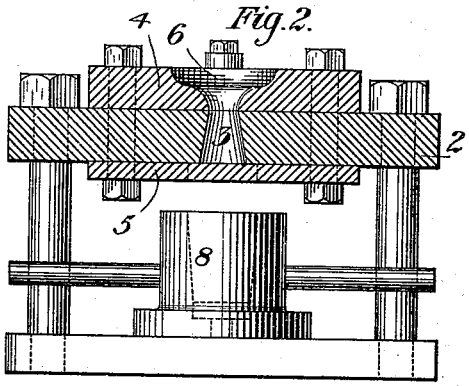
Figure 3:
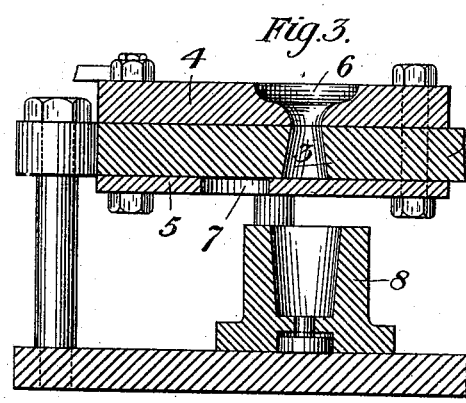
Figure 4:
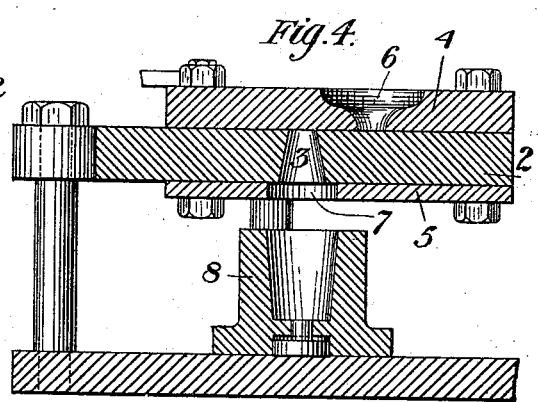
Figure 5:
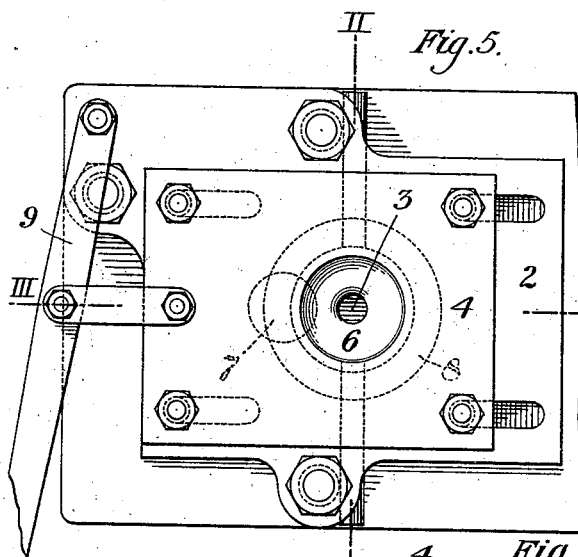
Figure 6:
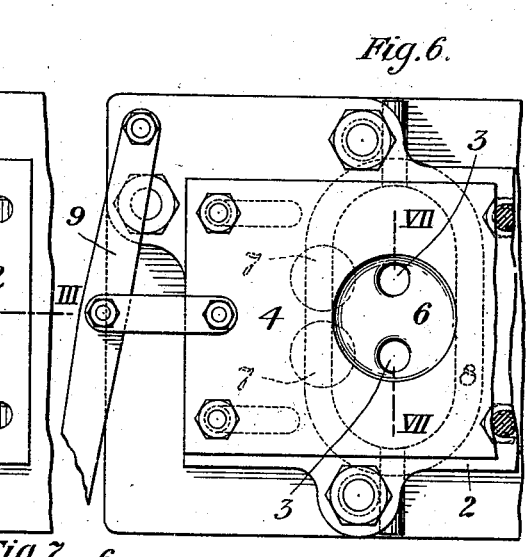
Figure 7:
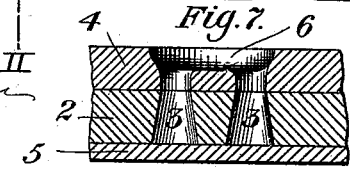

Figure 1 shows my improved apparatus in side elevation, partly in vertical section. Fig. 2 is a vertical cross-section on the line II II of Fig. 5, showing the parts in the positions which they occupy when the glass is fed thereto by the gathering-boy. Fig. 3 is a vertical section taken in the plane at right angles to the sectional plane of Fig. 2. Fig. 4 is a section similar to Fig. 3, but showing the parts as they are when the bottom gate has been moved so as as to permit the glass to drop into the mold. Figs. 5 and 6 are plan views of the apparatus, Fig 5 showing the same when adapted for use with a mold having a single matrix and Fig. 6 showing the same in connection with a mold having two matrices. Fig. 7 is a vertical cross-section on line VII VII of Fig. 6.

Like symbols of reference indicate like parts in each figure.

The object of my invention is to provide means for feeding to glass-molds measured quantities of plastic glass, and thus doing mechanically and accurately a work which has heretofore been done by highly-skilled workmen. I thus obtain a saving in cost of labor, and by getting more accurate results than have been possible heretofore I improve the product.

In the drawings, 2 represents a plate having formed therethrough a measuring-cavity 3, downwardly flaring in form.

4 and 5 are two plates mounted, respectively, on the top and bottom of the plate 2 and connected so that they may be moved simultaneously back and forth in contact with the plate 2. The top plate is formed with a hole 6 and the bottom plate with a hole 7, said holes being situate so that they shall register with the hole 3 at respectively opposite ends of the travel of the plates 4 and 5—*i. e.*, when the hole 6 is in register with the hole 3, Fig. 3, the hole 7 shall be out of register and that when the holes 7 and 3 are in register the hole 6 shall be out of register, Fig. 4. The hole 3 is made of proper size to contain the amount of glass required to be delivered to the mold.

The operation is as follows: The mold 8 to be charged with glass is placed under the plate 2, beneath the position of the hole 3, and the plates 4 5 are moved, so as to bring the holes 6 3 into register. The gathering-boy then introduces into the hole 6 with his punty enough molten glass to fill the cavity 3, and by means of the operating-lever 6 the plates 4 5 are moved so as to bring the holes 3 7 into register and to move the hole 6 away from the hole 3. The movement of the hole 6 away from register with the hole 3 shears off the glass in the hole 3 from the glass on the workman's punty, leaving in the hole 3 enough glass to fill the same accurately, and the movement of the hole 7 into register with the hole 3 causes the glass to drop from the latter into the mold 8 below. If desired, two or more molds or the cavities of molds having two or more matrices may be charged with glass at once by forming a corresponding number of holes in the respective plates 2, 4, and 5. This I illustrate in Fig. 6.

For the purpose of better shearing the glass in the hole 3 from the glass on the punty I may fix to the plate 4, at the margin of the hole 6, a separate steel shear-blade.

The form and construction of the parts may be varied without departure from my invention, since

What I claim is—

1. In apparatus for measuring and delivering glass to molds, the combination of a plate having a measuring cavity or cavities, a sliding gate at the base thereof, and a sliding shear plate or blade at the upper end of the cavity; substantially as described.

2. In apparatus for measuring and delivering glass to molds, the combination of a plate having a measuring cavity or cavities, a sliding plate at the base thereof, and a sliding shear-plate or blade at the upper end of the cavity, said shear-plate and gate being constituted by movable plates having holes adapted to register alternately with the measuring cavity; substantially as described.

3. In apparatus for measuring and delivering glass to molds, the combination of a plate having a downwardly flaring measuring cavity or cavities, a sliding gate at the base thereof, and a sliding shear plate or blade at the upper end of the cavity; substantially as described.

In testimony whereof I have hereunto set my hand.

THEODORE C. STEIMER.

Witnesses:
PHILLIP EBELING,
FRED. N. STEIMER.